US006470178B1

(12) United States Patent
Cummings-Hill et al.

(10) Patent No.: US 6,470,178 B1
(45) Date of Patent: Oct. 22, 2002

(54) VEHICLE RADIO HAVING RDS PRESETS AND METHOD THEREFOR

(75) Inventors: Mark Andrew Cummings-Hill, Carmel, IN (US); David Gordon Curry, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/541,709

(22) Filed: Apr. 3, 2000

(51) Int. Cl.[7] .................................................. H04B 1/18

(52) U.S. Cl. ................................ 455/186.1; 455/179.1; 455/345; 369/6

(58) Field of Search .............................. 455/186.1, 130, 455/133, 140, 142, 150.1, 152.1, 160.1, 161.2, 185.1, 179.1, 344, 345; 369/1, 2, 6, 7

(56) References Cited

U.S. PATENT DOCUMENTS

| | | | | |
|---|---|---|---|---|
| 5,235,568 A | * | 8/1993 | Masaru | 369/2 |
| 5,307,513 A | * | 4/1994 | Harada | 455/161.3 |
| 5,442,646 A | * | 8/1995 | Chadwick et al. | 375/296 |
| 5,504,482 A | * | 4/1996 | Schreder | 340/988 |
| 5,671,195 A | * | 9/1997 | Lee | 360/7 |
| 5,768,697 A | * | 6/1998 | Shirakawa | 455/181.1 |
| 6,081,690 A | * | 6/2000 | Worthy | 455/2.01 |

* cited by examiner

*Primary Examiner*—William Trost
*Assistant Examiner*—Congvan Tran
(74) *Attorney, Agent, or Firm*—Stefan V. Chmielewski

(57) ABSTRACT

The present invention provides for an easy-to-use radio that enables quick selection of radio station channels according to program type. The radio includes a receiver for receiving radio wave signals on radio station signal channels having radio data information, and has a tuner tuneable to one or more of the radio station signal channels. The radio has a processor for receiving and deciphering the radio data information and memory for storing a plurality of programmable preset channels according to a program type indicative of the type of the radio station broadcast. The radio further has a user input for selecting one of the programmable presets and for further selecting one of the preset radio station signal channels based on the selected preset.

20 Claims, 5 Drawing Sheets

VEHICLE RADIO HAVING RDS PRESETS AND METHOD THEREFOR

TECHNICAL FIELD

The present invention generally relates to audio radios and, more particularly, to a radio having radio channel selection presets for ease in selecting radio station channels and a method of selecting such channels.

BACKGROUND OF THE INVENTION

Automotive audio radios are typically equipped with a plurality of programmable presets for storing programmed radio station channels. The programmed radio station channels are selectable by an operator by depressing the corresponding preset pushbutton to enable the vehicle operator to quickly select a preprogrammed station without having to scroll through unwanted radio channels. The conventional channel preset programming generally requires that the radio be tuned to a radio frequency channel of interest and that the operator actuate a pushbutton, typically for a predetermined time period, to store the selected channel of interest in a preset memory to thereby program the corresponding preset. Once programmed, the operator may select the programmed station by depressing the corresponding preset pushbutton. This approach requires that each radio station channel entry must be programmed into a corresponding preset. In an automotive vehicle it is not uncommon for a vehicle to travel outside the range of preprogrammed radio channels, thereby requiring further manipulation of the radio to find a desired receivable radio station channel.

Recently, radio stations have adopted the radio data system (RDS) transmission format in which radio data system information is transmitted on a subcarrier of the radio frequency signal. The subcarrier is typically added to the stereo multiplexed signal or monophonic signal at the input of the FM transmitter associated with the transmitting radio station. Participating RDS radio stations commonly transmit the designated program type code associated with the station according to broadcast format adopted by the station. Currently, there are thirty-six (36) program type codes available, some of which include classic rock, hard rock, jazz, talk radio, oldies, and news. In addition to transmitting the program type, the transmitted RDS information may include the radio station identifier letters, as well as the name and artist for music, and other data. The RDS information is typically deciphered by a demodulator and is displayed on the radio display for viewing by the vehicle occupant(s).

Current RDS equipped radios display the RDS information along with the radio frequency on the radio display. When using an RDS vehicle radio, the vehicle operator is generally required to scan through the frequency band in search of radio station channels and must read the RDS information presented on the display as the vehicle is driven on the road to determine the program type for each station. When the RDS radio displays the station type on the radio display, if the operator intends to benefit from this information, the operator must read the display. This potentially creates a situation where the operator interfaces with the radio and has a significant amount of unnecessary head-down time, leading to decreased usability of the RDS function.

It is therefore desirable to provide for an audio radio that enables a user to quickly and easily receive a desired program type of radio station. It is further desirable to provide for an automotive radio that enables a vehicle operator to easily select radio station channels of interest according to the station program type in a manner that minimizes the amount of operator interface so as not to distract from the driver's operation of the vehicle.

SUMMARY OF THE INVENTION

The present invention provides for an easy-to-use radio having user programmable station type presets that enables quick selection of radio station channels according to a predetermined feature type, such as the station program type. To achieve this and other advantages and in accordance with the purpose of the present invention as embodied and described herein, the present invention provides for an electronic radio comprising a receiver for receiving radio wave signals broadcast on radio station signal channels and having radio data information, and a tuner tuneable to one or more of the radio station signal channels. The radio also has a processor for receiving and deciphering said radio data information, and memory for storing a plurality of programmable presets according to a predetermined feature of available radio station signal channels. The radio further has a user input for selecting one of the programmable presets and for further selecting one of the radio station signal channels based on the selected preset. Accordingly, the radio of the present invention advantageously allows a vehicle operator to program and select radio station channels according to the station program type and to quickly and easily access those types of signal channels.

These, and additional objects, advantages, features and benefits of the present invention will become apparent from the following specification.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
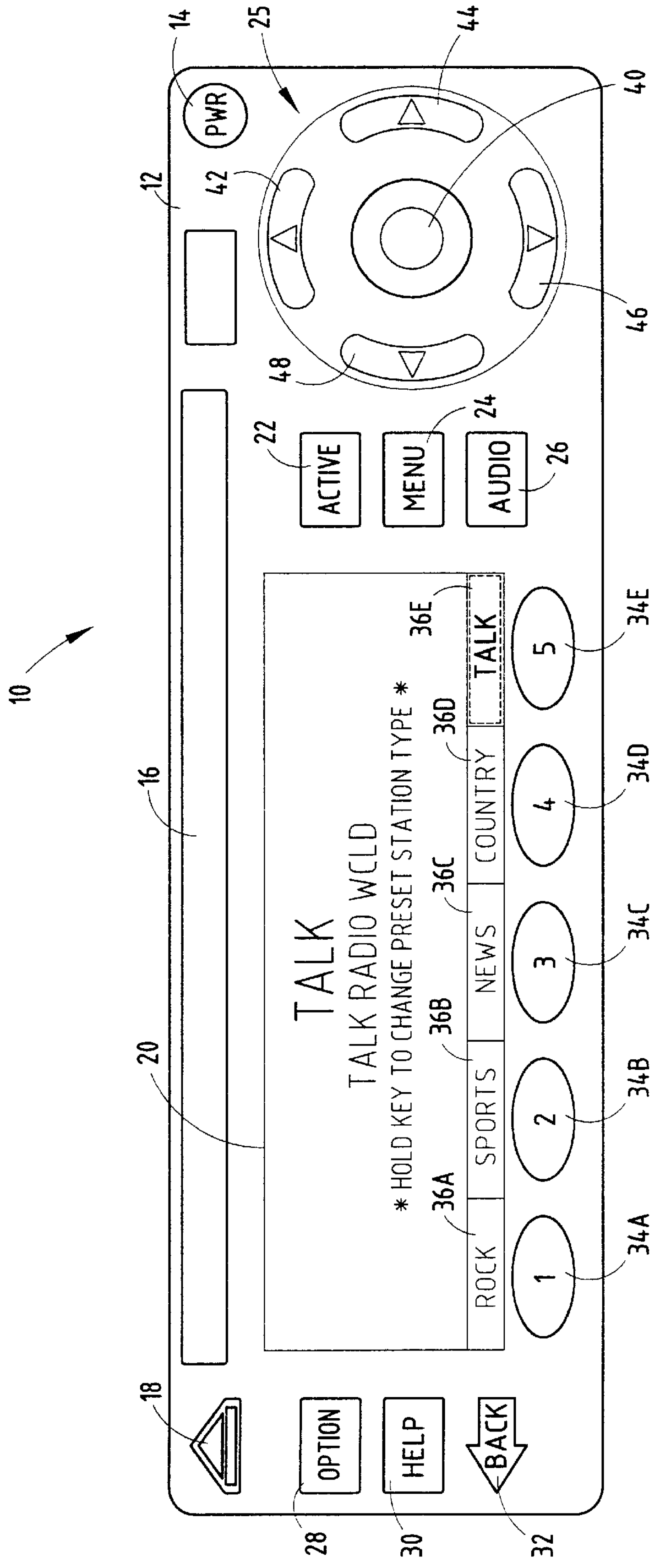
FIG. 1 is a schematic diagram illustrating an audio radio having RDS program type presets according to the present invention.

Referring to FIG. 1, an electronic audio radio 10 is shown which provides easy-to-use station program type presets according to the present invention. The audio radio 10 is particularly adapted for use in a mobile vehicle, such as an automobile. The audio radio 10 is packaged in a housing 12 and is shown equipped with other electronics including a compact disc (CD) player 16, and thereby also serves as an audio entertainment system. The audio radio 10 may further include other electronics such as navigation-related electronics, Mayday services, telephone electronics, etc. The housing 12 is generally configured to fit within the dash of an automotive vehicle in a location generally accessible to the vehicle occupants as should be evident to those skilled in the art.

The audio radio 12 includes a power on-off pushbutton 14 and a CD ejector pushbutton 18. In addition, radio 10 is equipped with user actuatable pushbuttons 22, 24, and 26 for selecting various modes of operation. ACTIVE pushbutton 22 selects an active mode of operation, MENU pushbutton 24 selects a menu mode of operation, and AUDIO pushbutton 26 selects the audio radio mode of operation. It should be appreciated that MENU pushbutton 24 may be repeatedly depressed to select from various available menus.

The audio radio 10 employs a display 20 for displaying alphanumeric characters and other graphics. Display 20 may include a liquid crystal display (LCD) according to one example. The audio radio 10 displays radio data system information on display 20 for viewing by the vehicle occupants. Examples of displayed radio data system information may include the radio signal channel frequency, the radio station name or identifier, and the designated station program type for a selected radio station channel, as well as various other types of information made available on RDS transmissions.

In addition, the audio radio 10 employs five depressible programmable preset pushbuttons 34A–34E. Preset pushbuttons 34A–34E are employed to select programmed information saved in preset memory locations. When operating in the audio RDS mode, the preset pushbuttons 34A–34E are used to select the programmed radio station program type, and further are used to select from radio station channels associated with the selected station program type. In the RDS programming mode, preset pushbuttons 34A–34E are used to initiate the RDS programming mode and to select the station program type that is programmed for each preset as will be described more fully herein.

Audio radio 10 also includes an OPTION pushbutton, a HELP pushbutton, and a BACK pushbutton 32. The OPTION and HELP functions provide additional information to the radio user, while the BACK pushbutton 32 allows the radio operator to return to the previous menu selection. The audio radio 10 is further equipped with a plurality of manually actuatable user input controls 25 which include four rosette keys 42, 44, 46, and 48, and a rotary pushbutton switch 40. Rosette keys 42, 44, 46, and 48 provide direction indicative commands to scroll through the menu selections. In particular, key 42 scrolls up, key 46 scrolls down, key 48 scrolls to the left, and key 44 scrolls to the right. Rotary pushbutton switch 40 is rotatable to control the audio volume. In addition, rotary pushbutton switch 40 may serve as a tuning selection control to provide radio frequency channel tuning as well as other functions according to different modes of operation. Further, rotary pushbutton switch 40 is depressible to select a menu item, such as a station program type or station channel, according to one embodiment. Accordingly, rotary pushbutton switch 40 may be depressed to select the current menu selection shown on the display, while rosette keys 42, 44, 46, and 48 allow a cursor to move from one selection to another selection on display 20.

The audio radio 10 is shown in FIG. 1 in the audio radio RDS mode selected to a talk radio station according to one example. In this example, the display 20 indicates the station program type as "TALK" and the radio station identifier as "WCLD." It should be appreciated that the displayed program type and station identifier will change when either a new program type or radio station channel is selected.

Figure 2:
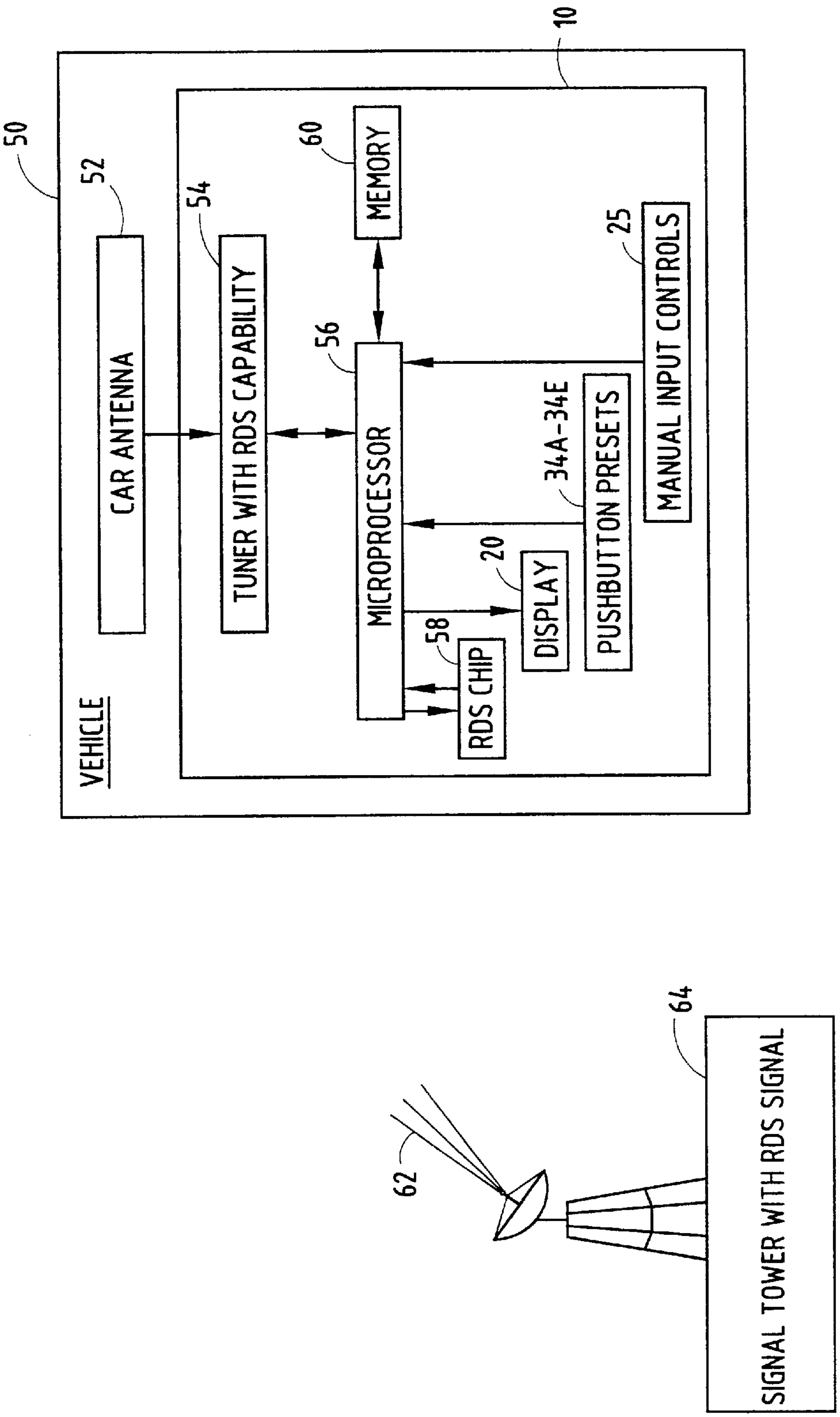
FIG. 2 is a block diagram further illustrating the radio employed in a mobile vehicle for receiving RDS radio signals.

Referring to FIG. 2, the audio radio 10 is shown employed in a automotive vehicle 50 which is equipped with a car radio antenna 52. Audio radio 10 has a tuner 54 configured with RDS capability as is generally known in the radio art. The tuner 54 generally receives and processes the radio wave signals received via the car antenna 52. The tuner 54 is tuneable to selected frequency channels and processes selected radio wave signals at the tuned frequency channel. The tuner 54 may further scan the frequency band to determine which signal channels are available. The tuner 54 communicates with a microprocessor 56 which, in turn, communicates with memory 60. Memory 60 includes designated memory for storing programmable presets including the station program type corresponding to each of the preset buttons. Audio radio 10 further includes an RDS chip 58 in communication with microprocessor 56. RDS chip 58 may include a commercially available RDS chip for deciphering the received RDS information.

The microprocessor 56 instructs the display 20 to output alphanumeric characters and other graphics for display to the vehicle occupants. The pushbutton presets 34A–34E provide signal inputs to microprocessor 56. The manual input controls 25 likewise provide signal inputs to microprocessor 56.

Also shown is a signal tower 64 for transmitting radio station signals along with RDS signals as is generally known in the radio broadcast art. Signal tower 64 transmits signals 62 according to the designated radio frequency channel for the corresponding radio station. The RDS signals may be carried on a subcarrier which is added to a stereo multiplexed signal or a monophonic signal at the input of the FM transmitter associated with the corresponding radio station. According to the preferred embodiment, the RDS signal is employed as the subcarrier and is generally applied to FM sound broadcast in the frequency range of 87.5 MHz to 108.0 MHz, which may carry either stereophonic or monophonic programs. According to the radio data system examples described herein, during stereo broadcast, the subcarrier frequency will be locked into the third harmonic at the 19 kHz pilot-tone, while during monophonic broadcast the frequency of the subcarrier will be approximately 57 kHz. According to this approach, the subcarrier is amplitude-modulated by the shaped and bi-phase coded data signal and the subcarrier is suppressed, and further the RDS subcarrier may include an amplitude-modulated, double-side band, suppressed carrier modulation. This method of modulation can alternately be thought of as a form of two-phase-shift-keying with a phase deviation of plus or minus ninety degrees. The radio data system subcarrier is one example of a known system that may be employed for carrying the program type information for use with the present invention.

Figure 3:
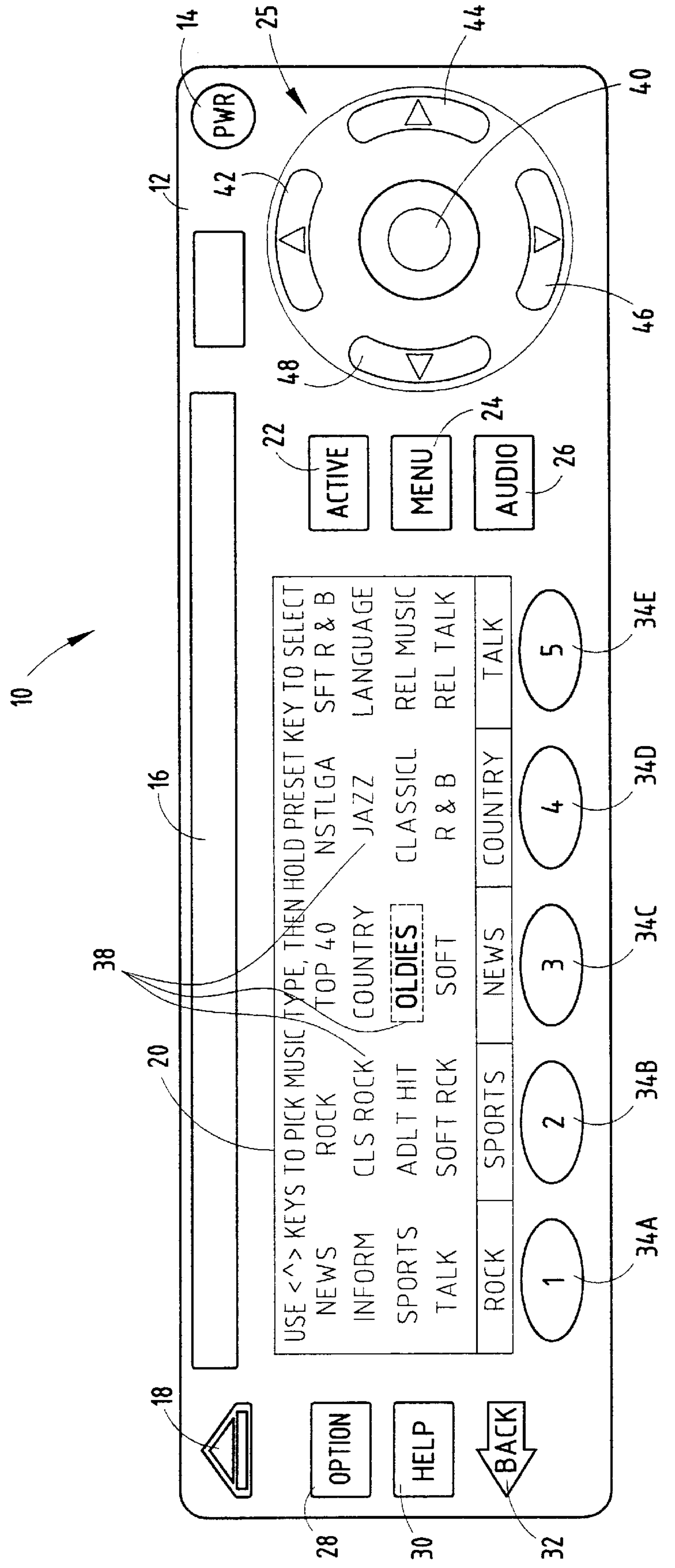
FIG. 3 is a schematic diagram illustrating the radio during the reprogramming of RDS program type selections.

With particular reference to FIG. 3, the audio radio 10 is shown in the RDS station program type programming mode according to one example. Currently, there exist approximately thirty-six (36) station program types to identify the type of radio program broadcast by a corresponding radio station. Several of the program types are shown on the display 20 in FIG. 3 and are available for selection to program the presets 34A–34E. Radio station program types are typically transmitted as alphanumeric codes on the RDS signal and are converted to the names as shown in the display. To enter the programming mode, an operator may depress one of the preset keys 34A–34E to be programmed for a predetermined amount of time, such as two seconds, which will call up the RDS programming mode and display the menu as shown. Once in the RDS programming mode, the rosette keys 42, 44, 46, and 48 may be actuated to scroll a cursor through the programming menu selections to select a new station program type, such as OLDIES, as shown by the highlighted cursor. Once the new station program type is selected, the operator may depress rotary pushbutton switch 40 to program the selection into the preset, or, alternately, may depress one of the presets 34A–34E to program the selection in that corresponding preset. Once the programming is complete, the menu returns to the RDS audio radio operation.

Figure 4:
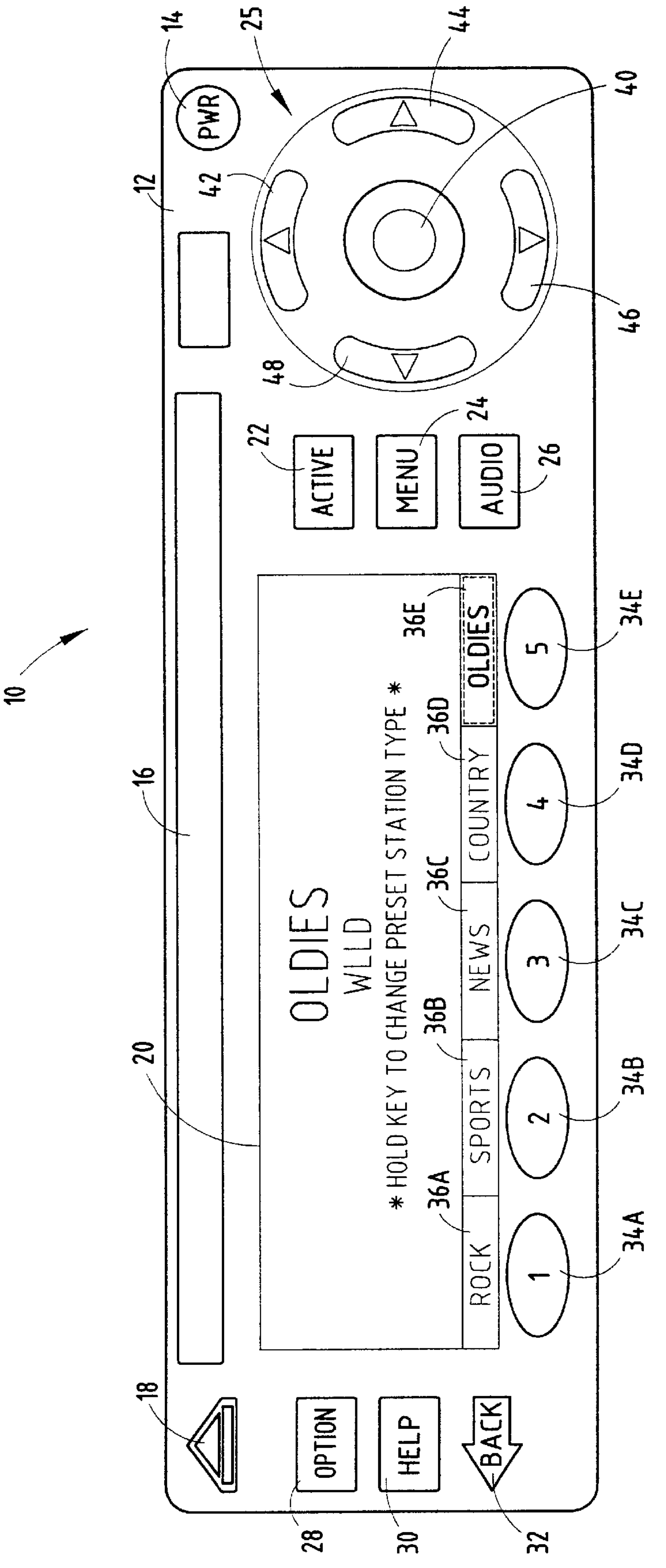
FIG. 4 is a schematic diagram further illustrating the radio following reprogramming of an RDS program type preset.

An example of programming preset 34E and selecting channels according to the program station type is as follows. Preset 34E is depressed for two seconds to enter the RDS program mode. The cursor keys are activated to select a new program type such as "oldies" as shown in FIG. 3. Preset 34E is then depressed to program "oldies" as the preset program type. With the preset selected to oldies, a user may further depress the corresponding preset 34E repeatedly to scroll through and select from only those radio station channels which have the program type "oldies." Referring to FIG. 4, an example of the RDS radio display is shown with one selection for the program type "oldies." It should be appreciated that the operator may further depress the preset 34E to select the next station received by the radio with the program type "oldies." It should be appreciated that the operator may depress another preset corresponding to a different program type and may further depress that key to successively select radio stations according to that program type.

Additionally, the radio 10 is configured in one embodiment to provide a seek/scan function according to the station program type. With a station program type such as "oldies" selected, a seek and/or scan function can be requested by an operator, such as by depressing a designated input control. For example, a radio station scan or seek operation can be initiated by depressing rosette key 44 to scan or seek to the next available radio station channel having the selected program type in order of increasing channel frequency, while rosette key 48 may be depressible to scan or seek to the next radio station channel having the selected program type in order of decreasing channel frequency. Accordingly, the scan or seek operation will find those stations limited to the selected station program type, and will ignore radio station channels not assigned to the selected program type.

Figure 5:
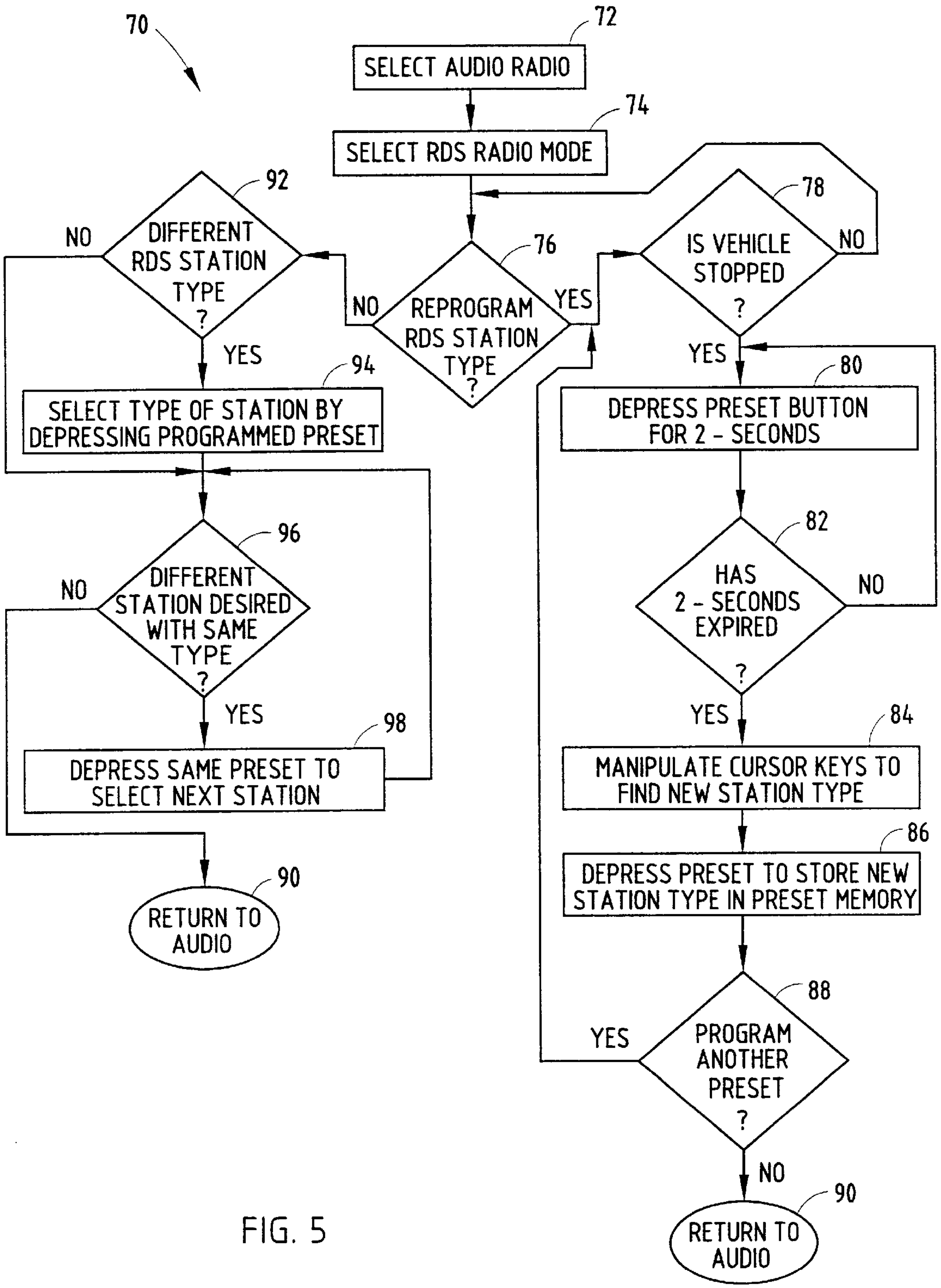
FIG. 5 is a flow diagram illustrating a methodology of programming and selecting RDS station program types according to the present invention.

Referring to FIG. 5, a methodology 70 of programming and selecting radio stations with the RDS radio 10 of the present invention is illustrated therein. Beginning at step 72, methodology 70 selects the audio radio mode and proceeds to step 74 to select the RDS radio mode. Decision block 76 checks for whether to reprogram the RDS station program type. If reprogramming of the RDS station program type is requested, methodology 70 proceeds to a programming routine beginning at block 78.

In the programming routine, decision block 78 checks for whether the vehicle is stopped and, if not, exits the programming routine and returns to decision block 76. Decision block 78 is an optional feature that requires that the vehicle is stopped prior to allowing for any reprogramming, and thereby serves as a safety precaution so that the driver of the vehicle is discouraged from reprogramming RDS program type presets while driving the vehicle. If the vehicle is stopped, methodology 70 proceeds to step 80 in which an operator depresses an RDS program type preset for a minimum predetermined time period of two seconds. Decision block 82 checks for whether the predetermined time period of two seconds has expired and, if not, waits for a two second depression. Once the two second time period has expired, methodology 70 proceeds to step 84 where the operator manipulates the cursor keys to select a new station program type. Thereafter, in step 86, the desired RDS preset is depressed by the operator to store the selected station type in the corresponding preset memory. Once the RDS preset has been programmed, methodology 70 proceeds to decision block 88 to check for whether to program another RDS preset. If another RDS preset is to be programmed, methodology 70 returns to decision block 78, otherwise the methodology 70 returns to the audio mode in step 90.

Returning to decision block 76, if reprogramming of the RDS station type is not requested, methodology 70 proceeds to an RDS station selection routine beginning at decision block 92. Decision block 92 checks for whether a different RDS station program type is requested and, if so, methodology 70 proceeds to step 94 where the operator selects the program type of station by depressing the preset programmed with that program type. Once the program type of station is selected, or if no change in RDS station program type is requested, methodology 70 proceeds to decision block 96 to check for whether a different radio station is desired with the same program type. If a different station with the same program type is desired, the operator, in step 90, depresses the same preset button to select the next successive station channel. If yet a different station is desired with the same program type, the operator may further depress the same preset to further select the next successive station available. This cycle may be repeated until a desired radio station is selected. Otherwise, methodology 70 proceeds to return to the audio mode in step 90.

Accordingly, the audio radio 10 and methodology 70 of the present invention provides for RDS program type selection and preset programming in a manner that is easy-to-use, and is well suited for use in an automotive vehicle. While FM radio frequency signals are employed with an RDS subcarrier for transmitting the radio station program type, it should be appreciated that the present invention may be applicable to other types of communication signals. For example, amplitude-modulated (AM) radio signal transmissions may be employed. It is also conceivable that the teachings of the present invention may be applicable to television station transmission or other high speed subcarrier systems. Further, it should be appreciated that other types of information other than program type may be transmitted and employed for preset programming and selection with the radio of the present invention without departing from the spirit and teachings of the present invention.

To those skilled in the art to which this invention appertains, the above-described preferred embodiments may be subject to change or modification. Such change or modification can be carried out without departing from the scope of the invention, which is intended to be limited only by the scope of the appended claims.

What is claimed is:

1. An electronic radio having user programmable station type presets, said radio comprising:

a receiver for receiving radio wave signals on radio station signal channels and having radio data information including a predetermined feature of each radio station signal channel;

a tuner tuneable to one or more of said radio station signal channels;

a processor for receiving and deciphering said radio data information including the predetermined feature;

memory for storing a plurality of programmable presets according to the predetermined feature of the radio station signal channels; and a user input for selecting one of the programmable presets and for further selecting one of the radio station signal channels based on the selected preset.

2. The radio as defined in claim 1, wherein said predetermined feature comprises a radio station program type.

3. The radio as defined in claim 2, wherein said radio station program type is provided as a program type code.

4. The radio as defined in claim 1, wherein said processor further compares the predetermined feature of said one of the selected programmable presets with the radio data information and allows selection of the corresponding signal channel based on said comparison.

5. The radio as defined in claim 1, wherein said radio data information is transmitted on a subcarrier of the radio wave signal.

6. The radio as defined in claim 5, wherein said subcarrier is a radio data system subcarrier.

7. The radio as defined in claim 5, wherein said radio wave signals comprise FM radio frequency signals.

8. The radio as defined in claim 1, wherein said user input comprises a menu and user input control buttons, wherein said user input control buttons are actuatable to scroll through said menu to select one of a plurality of predetermined features for programming each of said presets.

9. The radio as defined in claim 1, wherein said radio comprises a vehicle radio.

10. An electronic car radio having user programmable station program type presets, said car radio comprising:

a receiver for receiving radio wave signals on the radio station signal channels and having radio data information including a predetermined feature of each radio station signal channel;

a tuner tuneable to one or more of said radio station signal channels;

a processor for receiving and deciphering said radio data information including the predetermined feature;

memory for storing a plurality of programmable presets according to the predetermined feature indicative of the program type for radio station signal channels; and a user input for selecting one of the programmable presets and for further selecting one of the radio station signal channels based on the selected preset.

11. The radio as defined in claim 10, wherein said radio station program type is provided as a program type code.

12. The radio as defined in claim 10, wherein said processor further compares the program type of said selected programmable preset with the radio data information and allows selection of the corresponding signal channel based on said comparison.

13. The radio as defined in claim 10, wherein said user input comprises a plurality of user depressible pushbuttons for selecting programmable presets and for further selecting radio station signal channels based on the selected presets.

14. The radio as defined in claim 13, wherein said user input further comprises a menu and user input control buttons actuatable to scroll through said menu to select one of the plurality of predetermined features for programming each of said presets.

15. A method of selecting radio station signal channels for an electronic radio, said method comprising the steps of:

receiving radio wave signals having radio data information on radio station signal channels including a predetermined feature of each radio station signal channel;

processing said radio data information including the predetermined feature;

selecting a program type of radio station according to the predetermined feature with a user input; and selecting one of said radio station channels corresponding to said program type of radio station.

16. The method as defined in claim 15 further comprising the step of programming a plurality of presets to include program types of radio stations.

17. The method as defined in claim 16, wherein said step of programming comprises the steps of:

entering a preset programming mode;

scrolling through a plurality of selectable program types; and selecting one of said selectable program types to program as a preset.

18. The method as defined in claim 15, wherein said step of selecting a program type of radio station comprises selecting a station program type indicative of the type of radio station broadcast.

19. The method as defined in claim 15, wherein said electronic radio comprises a car radio located in a vehicle.

20. The method as defined in claim 15 further comprising the step of comparing the program type of the selected programmable preset with the radio data information and allowing selection of the corresponding signal channel based on the comparison.

* * * * *